US009020622B2

(12) United States Patent
Shoham et al.

(10) Patent No.: US 9,020,622 B2
(45) Date of Patent: Apr. 28, 2015

(54) AUDIO MONITORING SYSTEM AND METHOD OF USE

(75) Inventors: Avishai P. Shoham, Kfar Saba (IL); Ruwan Welaratna, Los Altos, CA (US)

(73) Assignee: Evo Inc., Wilmington, DE (US)

( * ) Notice: Subject to any disclaimer, the term of this patent is extended or adjusted under 35 U.S.C. 154(b) by 773 days.

(21) Appl. No.: 13/161,625

(22) Filed: Jun. 16, 2011

(65) Prior Publication Data

US 2011/0313555 A1 Dec. 22, 2011

Related U.S. Application Data

(60) Provisional application No. 61/397,840, filed on Jun. 17, 2010.

(51) Int. Cl.

| | |
|---|---|
| ***G06F 17/00*** | (2006.01) |
| ***G10L 25/48*** | (2013.01) |
| ***G08B 21/02*** | (2006.01) |
| *G08B 13/16* | (2006.01) |

(52) U.S. Cl.

CPC ............ *G10L 25/48* (2013.01); *G08B 21/0208* (2013.01); *G08B 13/1672* (2013.01)

(58) Field of Classification Search

CPC ........................ G08B 21/0208; G08B 13/1672
USPC ........................... 700/94; 340/3.1, 506, 573.1
See application file for complete search history.

(56) References Cited

U.S. PATENT DOCUMENTS

| | | | | |
|---|---|---|---|---|
| 5,668,780 | A | 9/1997 | Hsieh | |
| 6,496,115 | B2 | 12/2002 | Arakawa | |
| 7,009,520 | B2 | 3/2006 | Thompson | |
| 7,053,779 | B2 | 5/2006 | Thompson | |
| 7,076,211 | B2 | 7/2006 | Donner et al. | |
| 7,274,298 | B2 | 9/2007 | Frank | |
| 7,408,471 | B2 | 8/2008 | Thompson | |
| 7,425,901 | B2 | 9/2008 | Groover | |
| 7,642,911 | B2 | 1/2010 | Desrosiers et al. | |
| 7,659,814 | B2 | 2/2010 | Chen et al. | |
| 7,822,387 | B2 | 10/2010 | Gross | |
| 2002/0135485 | A1 * | 9/2002 | Arakawa | 340/573.1 |
| 2004/0253926 | A1 * | 12/2004 | Gross | 455/67.11 |
| 2009/0222263 | A1 * | 9/2009 | Collotta et al. | 704/233 |

* cited by examiner

*Primary Examiner* — Joseph Saunders, Jr.
(74) *Attorney, Agent, or Firm* — Quinn Law Group, PLLC.

(57) ABSTRACT

A method includes receiving audible sound signals such as the cries of a baby via a microphone of a monitor, and processing the signals to identify whether a predetermined acoustic signature is present. An alert may be generated when the predetermined acoustic signature is present. An information data signal such as a discrete data packet quantifies how closely the sounds match the predetermined signature, and is transmitted to a remote device. The server may aggregate these data packets over time and calculate a variance between the aggregated data packets and a baseline. A report may be generated describing the sound signals and variance. A monitoring system having the monitor and a server are also disclosed.

18 Claims, 5 Drawing Sheets

| # Sec | EPS | | | | | Pitch Bin | Volume (Loudest Sample) |
|---|---|---|---|---|---|---|---|
| | 1 | 2 | 3 | ••• | 10 | | |
| 10 | 0 | 0 | 6 | ••• | 0 | 5 | 8 |

AUDIO MONITORING SYSTEM AND METHOD OF USE

CROSS-REFERENCE TO RELATED APPLICATIONS

The present application claims the benefit of U.S. Provisional Application No. 61/397,840, which was filed on Jun. 17, 2010, and which is hereby incorporated by reference in its entirety.

TECHNICAL FIELD

The present disclosure relates to the monitoring and analysis of the cries of a baby or other monitored sounds.

BACKGROUND

Microphones are used in a host of applications to remotely monitor an environment for a particular sound. For instance, microphones are typically used in conventional baby monitoring systems, either alone or in conjunction with a video camera. A microphone may be housed within a monitor and placed in wireless communication with a base unit or receiver. The receiver is then tuned to the transmitting frequency of the monitor and positioned within a relatively short distance of the monitor so as to clearly receive any transmitted signals.

Conventional baby monitoring systems may also indicate the level of a received sound by illuminating a series of light emitting diodes (LEDs). In this manner, even with the volume turned down on the receiver, a parent or caregiver can still "see" just how loud a baby is crying in another room, even if the crying itself is not audible directly or via the receiver.

Advances in wireless technology have enabled the development of more sophisticated monitoring systems. For instance, a user can now position a miniature web camera in a room and remotely access a website to selectively view the collected video, with or without accompanying audio. As modern cell phones are typically equipped with Internet connectivity, these webcam devices allow a parent or caregiver to selectively view a monitored area from virtually anywhere. However, remote monitoring approaches tend to relay all collected video and audio signals to a user for the user's consumption. Such comprehensive real-time surveillance may not be desirable in certain circumstances, and also may not provide optimal insight into the collected information.

SUMMARY

A method is disclosed herein for detecting particular sounds within a monitored environment, and for selectively generating alerts in response to the detected sounds. A monitor used as part of the present method may be configured as a baby monitor and positioned within a nursery. As will be explained in detail below, the present method uses corresponding hardware and software components of the monitor to process received sound signals and thereby recognize whether a predetermined acoustic signature is present therein. In this manner, the monitor can detect crying or any other programmed sound.

The method includes receiving sound signals via a microphone of the monitor and processing the received sound signals using the monitor. Such processing includes identifying whether a predetermined acoustic signature such as crying is present in the received sound signals. The method also includes generating an information signal quantifying how closely the received sound signals match the predetermined acoustic signature over a configured interval. The data packet is transmitted from the monitor to a server or other remote device. The server/remote device can then generate alerts as needed depending on the pattern or other signature feature presented by the information in the information signals over time.

In some embodiments, the signals may be discrete data packets which are aggregated over time by the server/remote device and carefully evaluated for trends and/or for comparative insights. For example, the data packets may be analyzed relative to a baseline, such as by comparing the sleeping habits of a monitored baby to other babies of the same age, the same baby over an earlier time period, a particular demographic, and/or other desired reference criteria.

A baby monitoring system is also disclosed herein having a baby monitor with a microphone which receives sound in the form of audible cries. The baby monitor is in wireless communication with a server via an access point. The monitor receives the sound signals from the microphone and processes the sound signals to identify whether a predetermined acoustic signature is present that is emblematic of crying.

The server may include a first module configured for generating an alert when information signals from the monitor indicate that a sufficient match is present with the predetermined acoustic signature. The server may also include a second module configured for transmitting the alert to a computing device, e.g., a phone, tablet computer, or other suitable device of the user. The monitor may apply a power cepstrum and/or magnitude spectrum to determine if an energy level or energy ratio(s) in the received signals match a pre-defined pattern.

The above features and advantages and other features and advantages of the present invention are readily apparent from the following detailed description of the best modes for carrying out the invention when taken in connection with the accompanying drawings.

DESCRIPTION

Figure 1:
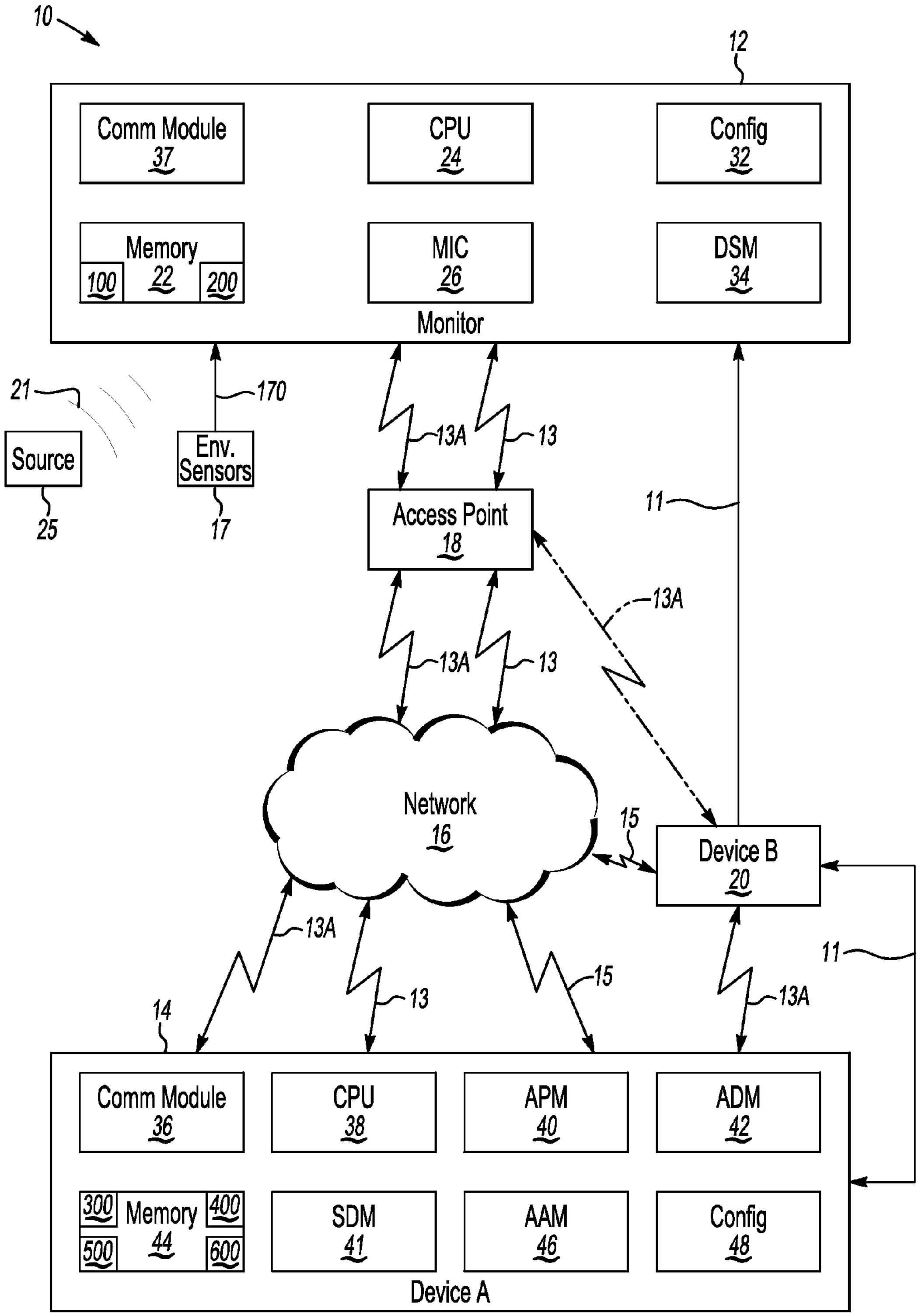
FIG. 1 is a schematic block diagram illustration of a monitoring system as set forth herein.

Referring to the drawings, wherein like reference numbers correspond to like or similar components throughout the several figures, a sound monitoring system 10 is shown schematically in FIG. 1. The present sound monitoring system 10 includes a sound monitor 12 which receives audible sound signals 21 from a monitored source 25. In a particular embodiment, the sound monitoring system 10 is a baby monitoring system, with the monitor 12 being programmed to detect the frequency range of the cries of a typical baby. However, those of ordinary skill in the art will appreciate that the functionality of the monitor 12 is not limited to cry detection, and that the monitor 12 may be alternatively programmed to accurately process other types of sound signals 21 from different sources 25.

The monitor 12 is in remote communication with a remote device (Device A) 14, e.g., a server in one embodiment, or optionally a phone, laptop, tablet computer, or any other suitable device. Although not shown in FIG. 1 for illustrative clarity, multiple monitors 12 may be used to communicate with each other and/or with the remote device 14 depending on the design and intended use of the monitoring system 10. Each monitor 12 may be configured to stream data (arrows 13A), for instance to the remote device 14, from which it can be streamed to a networked computing device 20 (Device B) as continuous audio, video, or other signals if so desired.

The monitor 12 uses a microphone (MIC) 26 to collect the sound signals 21 corresponding to noises emitted by the source 25 within a monitored environment. The microphone 26 may be configured in one embodiment as an electret microphone of the type known in the art, or any other microphone design which receives the sound signals 21 as they emanate from the source 25 within listening range of the monitor 12.

As will be explained in detail below, the monitor 12 initially processes the received sound signals 21 in order to detect whether the sound signals 21 match a predetermined acoustic signature such as a cry. A user can automatically receive an alert (arrows 15) via the computing device 20 in the form of text, email, a phone call, etc., when the detected cries or other monitored noises sufficiently match the predetermined acoustic signature over a period of time. Other capabilities of the present monitoring system 10 are set forth below with reference to the various Figures.

The monitor(s) 12 of FIG. 1 may be placed in networked communication with the server/remote device 14 over a suitable network 16, e.g., the Internet, a local area network (LAN), a wide area network (WAN), a metropolitan area network (MAN), etc. The network 16 may be a combination of two or more wireless networks communicating with one another using various communication protocols across any communication medium, as is well understood in the art.

Each monitor 12 may be configured with a set of computer-executable instructions suitable for executing the methods 100 and 200, an example of each being respectively shown in FIGS. 3 and 5 and explained in detail below. These instructions may be recorded on tangible, non-transitory memory 22 of the monitor 12, with associated hardware and software elements of the monitor 12 executing the instructions. Execution of the instructions allows remote monitoring of the sound signals 21 as audible sound waves emanating from the monitored source 25 located in a monitored environment, such as a nursery or a bedroom of a house.

The sound signals 21 are initially processed and analyzed using various logic and circuit elements of the monitor 12. Targeted processing of the received sound spectrum of the sound signals 21 by the monitor 12 ultimately detects specific acoustic signatures contained therein, possibly on a frame-by-frame basis as set forth below, such as a particular pattern corresponding to crying. In this manner, it is possible to determine if the received sound signals 21 or any discrete portions thereof substantially match a predetermined acoustic signature. As noted above, although the examples provided herein primarily relate to baby monitoring, those of ordinary skill in the art will appreciate that the present approach may also be applied to a host of other common sound monitoring scenarios in a variety of different environments, such as but not limited to security (e.g., breaking glass), pet monitoring, and the like, by changing the configuration parameters.

The monitor 12 shown schematically in FIG. 1 may transmit information in the form of information data signals (arrows 13) to convey information to the server/remote device 14 via a wireless access point 18, e.g., a wireless router. The remote device 14 can then selectively transmit an alert (arrows 15) to the computing device 20 over the network 16. Alternatively or concurrently, the monitor 12 may continuously transmit/stream information to the computing device 20 as noted above, either directly or via the remote device 14.

The information data signals (arrow 13) and alerts (arrows 15) may be recorded in tangible/non-transitory memory 44 of the server/remote device 14 for short-term and/or long-term data aggregation, analysis, and detailed reporting. Various non-limiting examples of this functionality are described below in detail with reference to FIG. 10.

Still referring to FIG. 1, the monitor 12 and the remote device 14 may be configured as digital computers having respective microprocessors or central processing units (CPUs) 24 and 38, as well as sufficient read-only memory (ROM), flash memory, random access memory (RAM), electrically erasable programmable read only memory (EEPROM), a high-speed clock, analog-to-digital (A/D) and/or digital-to-analog (D/A) circuitry, and any required input/output circuitry and associated devices, as well as any required signal conditioning and/or signal buffering circuitry.

Any required process instructions for the various methods described herein may be stored in memory 22 and/or 44 and readily accessed by the monitor 12 and/or the server/remote device 14 to provide the specific functionality described below. For instance, instructions embodying the methods 500, 300, 400, and 600 of FIGS. 7-10, respectively, may be recorded in memory 44 and executed by the CPU 38 and any other required hardware and software components of the remote device 14.

The monitor 12 of FIG. 1 may also include a communications module 37 containing any protocol required for communicating with other networked devices, and a Data Streaming Module (DSM) 34 in communication with the communication module 37. The DSM 34 may be configured to stream data between the monitor 12 and the computing device 20 via the access point 18 and/or the network 16. In some embodiments, the DSM 34 may optionally perform data compression, and may convert the sample rate of any audio data samples. The remote device 14 may also include a Stream Distribution Module (SDM) 41 for directing any streaming data as needed, e.g., to the computing device 20. SDM 41 may uncompress, duplicate, resample, and compress any audio data stream received in order to stream the data to multiple computing devices 20.

The remote device 14 of FIG. 1 likewise includes a communication module 36. The remote device 14 may include an Alert Parsing Module (APM) 40 which receives and processes the information data signals (arrows 13) to determine if an alert (arrows 15) should be generated. That is, the information data signals (arrows 13) provide information on the baby or other source 25 regardless of whether the sound signals 21 actually present, at any given moment, an acoustic signature necessitating such an alert (arrows 15). This enables useful intelligence to be gathered on the patterns and habits of the monitored source 25 as is further noted below in the disclosure relating to data aggregation and reporting.

An Alert Analysis Module (AAM) 46 of the remote device 14 may be used to analyze the information data signals (arrows 13) generated and transmitted by the monitor 12, and to decide whether to generate an alert (arrows 15) as a function of the information conveyed in the information data signals (arrows 13), e.g., information in a plurality of discrete frames of a data packet as explained herein. For instance, the remote device 14 may use the AAM 46 to calculate a rolling average, a percentage of passed frames vs. total frames, etc., rather than a threshold comparison used in various conventional devices. The AAM 46 of the remote device 14 ultimately determines an appropriate action to take based on the received information data signals (arrows 13) from the monitor 12, as well as using any user configuration settings recorded in a Configuration Module 48.

Figure 2:
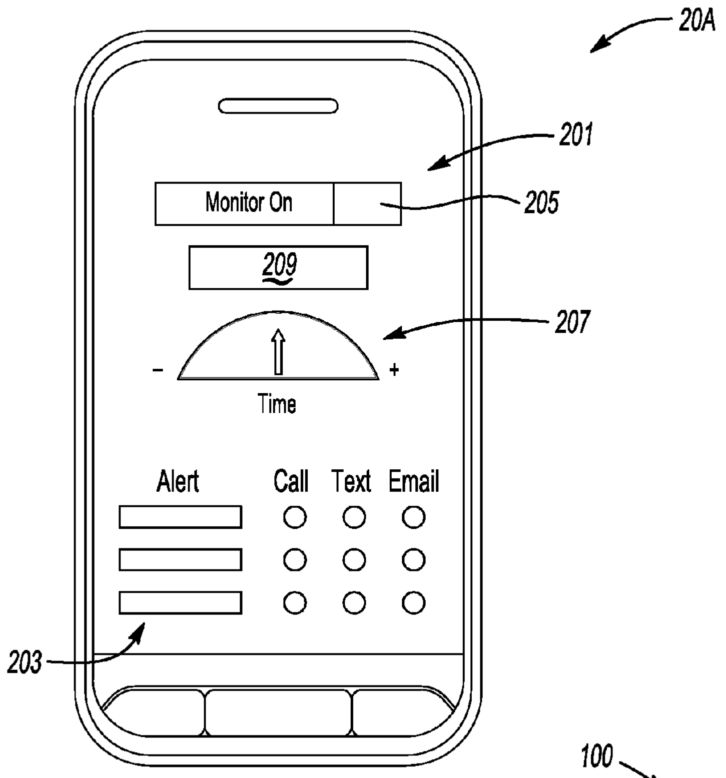
FIG. 2 is a schematic illustration of an example touch-screen computing device having user-selectable configuration settings.

Within the remote device 14 shown in FIG. 1, an Alert Distribution Module (ADM) 42 may be used to communicate the alerts (arrows 15) to one or more users, e.g., to the computing device 20 over the network 16, based on the user's selected settings as shown in FIG. 2 and discussed below. Possible distribution formats from the ADM 42 of the remote device 14 include, by way of non-limiting examples, text messages, voice/audio messages, light and/or sound indicators, client device specific push notifications, and/or email messages. The alert may include initiating the streaming of audio data.

In terms of user configuration, a Configuration Module 32 of the monitor 12 and the Configuration Module 48 of the remote device 14 may each record various user settings and/or preferences as needed, which may be received via the user configuration settings (arrow 11), potentially including the model and/or type of monitor 12. The user configuration settings (arrow 11) may be entered and recorded in one embodiment by accessing a web page associated with the monitor 12, for instance by logging into the remote device 14. User configuration settings (arrow 11) may also be entered on the computing device 20, such as by launching an application associated with the user's account. Both the web page and app can allow users to manage multiple monitors 12. The monitor 12 may also receive additional sensory data (arrow 170) from environmental sensors 17, e.g., video, humidity, temperature data, etc., as explained below.

Referring briefly to FIG. 2, an example computing device 20 is shown as a mobile touch-style/smart phone 20A which launches a software application in response to a user pressing an icon. This in turn launches various touch-screen options 201, 203, 205, and/or 207. For example, option 201 may indicate at a glance whether the monitor 12 of FIG. 1 is online, for instance using text and/or color. A user could also move a virtual switch 205 to turn the monitor 12 on or off. The status may be determined, by way of a non-limiting example, using the method shown in FIG. 8.

Option 207 may be selected by a user to increase (+) or decrease (−) an amount of listening time or the length of the sampling interval (T) described below. Option 203 could be used to select the manner in which a user wishes to be alerted, such as by call, text, or email, for various different sound events. For instance, for a particular cry duration or amplitude, one may wish to be called on the phone or texted. For a cry signature having a lower priority, e.g., intermittent low level cries as the baby falls asleep, the same user may wish to receive an e-mail, or no alert at all. Option 209 may be a button or icon the user presses to call back to the monitor 12, effectively allowing the sound signals 21 of FIG. 1 to be streamed as data signals (arrows 13A of FIG. 1) to the computing device 20A, effectively allowing the user to listen in real time to the sound signals 21 from the source 25.

Figure 3:
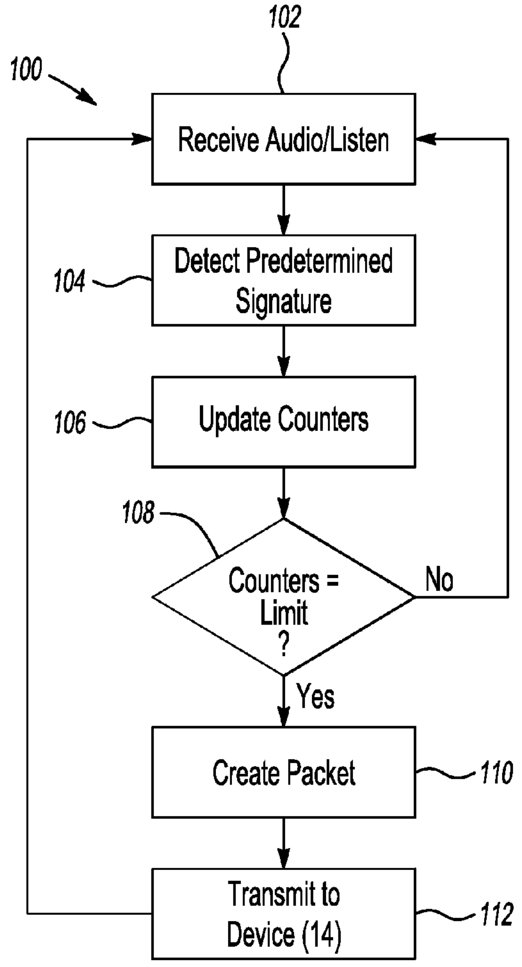
FIG. 3 is a flow chart describing an example method for monitoring a baby or other source of variable sound using the system shown in FIG. 1.

Referring to FIG. 3, a flow diagram illustrates an example method 100 for monitoring the sound signals 21 using various components shown in FIG. 1. Beginning with step 102, the monitor 12 of FIG. 1 receives the sound signals 21 emanating from the source 25. That is, the monitor 12 is placed in listening range of the source 25, such as by placing a baby monitor on a shelf in a nursery in the example of a baby monitoring system. Step 102 entails actively receiving audio information from the monitored environment, whether as periods of silence/background noise or as intermittent or sustained cries or other noises.

While some embodiments of step 102 may entail collecting and recording only certain sound events matching an expected acoustic pattern or other spectral signature, it is contemplated herein that one could collect and record additional encountered sound events using the additional environmental sensors 17 shown in FIG. 1 to provide additional insight into the sustained patterns of the environment containing the monitored source 25, and therefore to provide a useful basis for aggregation and analysis. In turn, such aggregation and analysis can be used if so desired to change the behavior of the source 25, e.g., the sleep habits of a baby.

At step 104, the monitor 12 of FIG. 1 processes the sound signals 21, for instance a digital or analog amplitude and frequency spectrum of the collected sound signals 21 received by the microphone 26 or any other suitable acoustic or spectral information, to thereby detect or otherwise identify a sufficient match with a predetermined acoustic signature, doing so on a frame-by-frame basis as explained below. This may entail detecting a particular pattern and/or distribution of pitch, amplitude, frequency, volume, duration, and/or other descriptive acoustic information.

In one possible embodiment, step 104 may entail dividing each second of time into a plurality of equal time segments or frames, e.g., 12-16 frames per second in a 10 second interval (T). Each frame is then separately analyzed in step 104 to detect a cry for that particular frame independently from the other frames in the same second of time, e.g., using a harmonic signature tracker or other suitable signal processing approach. The monitor 12 of FIG. 1 can then count or otherwise determine how many frames pass through the harmonic signature tracker per second, and can also compile a data packet after passage of the sampling interval (T) using the collected information. Step 104 may entail applying a transformative downsampling process to the received sound signals 21 to thereby generate a binary value for each of a plurality of frames of the interval noted above, e.g., 1 representing crying and 0 representing not crying.

Figures 4, 5:
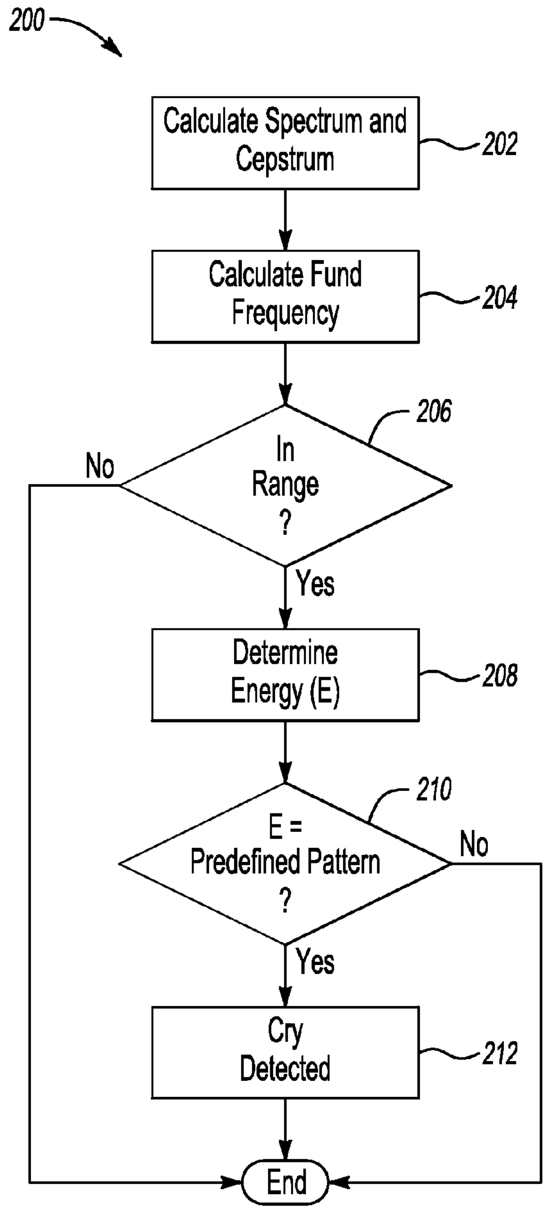
FIG. 4 is a schematic illustration of an example discrete data packet which may be generated by the monitor shown in FIG. 1.
FIG. 5 is a flow chart describing an example method for detecting a cry or other monitored noise using the monitor shown in FIG. 1.

An example data packet is shown in FIG. 4 and explained below. Each data packet, and the various frames each second of the data packet comprises, is discrete or self-contained relative to any other data packets/frames which precede or follow. Thus, over one minute, there may be six different data packets of 10 seconds each, which are periodically generated and transmitted by the monitor 12, with each second of time having a plurality of discrete frames, and with each frame reporting information as to maximum acoustic values encountered in the sound signals 21 for that particular frame, or within each second.

As an illustrative example, when a baby is crying within listening range of the monitor 12 of FIG. 1, every collected frame of information may not pass the harmonic signature tracker. For instance, when a baby cries for an interval of 10 seconds, the harmonic signature tracker may identify eight frames in one second as corresponding to the acoustic signature of crying, six frames in the next second, none in a subsequent frame, and so on. The monitor 12 uses signal processing logic to determine the particular content of each frame, and whether or not the collected data is indicative of crying. The same approach may be used for other sound events.

At step 106, the monitor 12 of FIG. 1 may update counters, such as a current second counter and a frame counter, before proceeding to step 108.

At step 108, the monitor 12 determines whether or not the value held by the current second and frame counters equals a corresponding threshold, e.g., interval (T) or a particular number of frames for a given second in the interval (T). The monitor 12 executes step 110 when the counters reach their limits. Otherwise, the monitor 12 repeats step 102.

At step 110, the monitor 12 creates a discrete data packet describing how closely the detected signals 21 match the predetermined acoustic signature. The data packet is then transmitted to the remote device 14 of FIG. 1 at step 112. The method 100 resumes with step 102, thus building and periodically transmitting a new data packet, e.g., after completion of each interval (T).

Referring to FIG. 4, an example discrete data packet may include a plurality of descriptive data fields as shown. Other data packets may be envisioned, with the example of FIG. 4 intended to illustrate one non-limiting concept. The monitor 12 of FIG. 1 communicates with the remote device 14 once every (T) seconds, and transfers the collected information as a data packet every (T) seconds regarding the qualities of the detected sound signals 21 and how closely these signals 21 match the predetermined acoustic value for each frame. Interval (T) may be recorded and thus known a priori by the device 14 and the monitor 12. The remote device 14 may update the interval (T) as needed. A new data packet may be transmitted to the remote device 14 every (T) seconds, regardless of whether a monitored cry or other noise is actually detected, to fully enable tracking and monitoring of the source 25 of FIG. 1, for instance logging periods of restful sleep for analysis relative to periods of restless or interrupted sleep.

Another field in the data packet may describe Events Per Second (EPS), e.g., cries per second. As noted above, each second may be divided into a plurality of frames. Any frame in which the acoustic signature is detected may receive a value of 1. Thus, in a 12-frame non-limiting example, the range of values passed for any given second is [0-12].

Upon completing the requisite number of frames in a second, the next second of measurement commences, and so on until interval of duration (T) expires. A data string of values may be recorded for inclusion in the discrete data packet, such as the string [0, 0, 2, 5, 0, 12, 12, 4, 2, 0] corresponding to no matching frames occurring in the $1^{st}$, $2^{nd}$, $5^{th}$, and $10^{th}$ frames, two threshold frames in the $3^{rd}$ and $9^{th}$ frames, and so forth.

Additional data fields may include "Pitch Bin" and "Volume", or any other desired audio quality or quantity, with each of these two data fields describing the value associated with the loudest cry or other detected noise, either over the interval T or for each frame or each second, or if no matching frames were detected, the loudest noise over the duration of interval (T). The computing device 20 could then be optionally configured with a volume indicator, e.g., somewhat similar in appearance to the LED-style used on conventional baby monitors.

The remote device 14 of FIG. 1 receives the discrete data packet and evaluates a plurality of data packets over time to see if an alert is required. For instance, the remote device 14 may determine if the data packet contains two or more seconds with more than two matching frames, e.g., cry frames in the example that the source 25 is a baby, one second with three or more cry frames, or at least five seconds with more than one and fewer than 10 cry frames. If the data packet(s) correspond to the predetermined acoustic signature over a period of time, the entire data packet may be assigned a Packet Value (PV) of 1. Other packets may be assigned a PV of 0.

The remote device 14 may then input PV into a suitable recursive equation, e.g.:

Event Metric=0.5*(PV+Event Metric)

where the value "Event Metric" is initialized to zero, and an associated flag is initialized to FALSE. In one possible approach, if Event Metric>0.6, the flag, for instance a crying flag, is set to TRUE. If the value of the Event Metric drops below 0.1, the flag is set to FALSE. The time at which a cry or other monitored sound starts is recorded, and each time a new data packet arrives and the source 25 is still making the sounds, the remote device 14 determines if alerts are desired for that sound, for instance by checking the configuration settings in module 48 of the remote device 14.

Referring to FIG. 5, for crying in particular, the frame-level detection performed by the monitor 12 may proceed according to a non-limiting example method 200. At step 202, the monitor 12 of FIG. 1 may calculate the magnitude spectrum and power cepstrum for each input frame, as such terms are known in the art. Once these values have been calculated, at step 204 the monitor 12 can next identify the frequency of the cepstral peak and convert this frequency to a fundamental frequency.

At step 206, the monitor 12 can determine if the fundamental frequency from step 204 lies within a calibrated range, e.g., between approximately 300 Hz and approximately 800 Hz in one possible embodiment. If so, the monitor 12 executes step 208, wherein the monitor 12 finds the energy associated with each of the areas harmonically related to the fundamental frequency in the magnitude spectrum. If not, the method 200 is finished.

At step 210, the monitor 12 determines if the energy from step 208 matches a pre-defined energy ratio pattern. Again in the case of crying, the pre-defined energy ratio pattern may be that the energy at twice the fundamental cannot be the largest amount of energy, the two largest energy values cannot be adjacent harmonics, and the ratios of the energy values of the harmonics to the fundamental of the three largest energy values must exceed a predetermined set of values, e.g., [8, 4, 3].

In a particular implementation, a combination of these steps may be carried out on squared data, and log 2 may be used in calculating the cepstrum. If the energy ratios match the pre-defined pattern, the monitor 12 detects a cry at step 212, otherwise the method 200 is finished. Other embodiments may exist which provide frame-level cry detection without departing from the intended scope. Some non-limiting examples may include zero-crossing detection, autocorrelation, foment calculation, etc.

Figure 6:
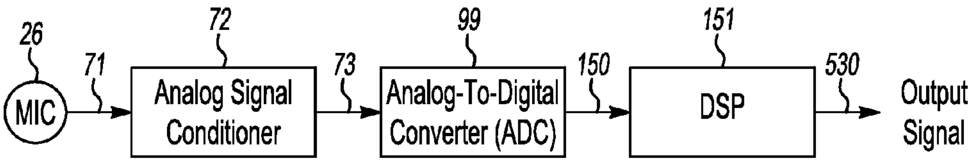
FIG. 6 is a block diagram of circuit elements usable with the monitor shown in FIG. 1.

Referring to FIG. 6, the components involved in any digital-based embodiment may include the microphone 26 and an Analog Signal Conditioner 72, as well as an Analog-to-Digital Converter (ADC) 99 and a Digital Signal Processor (DSP)

151, which may be implemented as part of the CPU 24 shown in FIG. 1. The analog signal 71 from the microphone 26, which may be amplified, is first conditioned by the Analog Signal conditioner 72 before being communicated as a conditioned signal (arrow 73) to the ADC 99. The ADC 99 converts the conditioned signal (arrow 73) into a digital signal (arrow 150) that can be received and processed by the DSP 151. The DSP 151 performs various processing operations (discussed below) on the received signal (arrow 150) and generates an output signal (arrow 530).

In various possible embodiments, the DSP 151 of FIG. 6 may detect an acoustic signature using any suitable signal processing techniques. For instance, from the ADC 99 the DSP 151 may create a buffer of a certain number of time-contiguous samples, apply a window, and apply a Fourier transform component, e.g., a fast Fourier transform (FFT), to the windowed sample. A Gaussian or other spectral line summation approach may be applied to the Fourier transform output and compared to a preset threshold pattern. Together with the window function, a Fourier transform can be used to perform a function similar to a group of narrow band pass filters.

Alternative approaches may use a peak finder and a peak signature check in place of the spectral line summation and threshold pattern comparison. Additionally, the DSP 151 may include a power cepstrum, a spectral peak finder, and a peak signature checker as noted above. As understood in the art, a cepstrum is the result of taking the Fourier transform of the logarithm of the magnitude spectrum of a digital signal. A peak signature checker may determine a number of peaks in a given signal that are within a calibrated tolerance, and determine whether the peak separation is within tolerance and whether the identified peaks are harmonically related. Peak widths are checked to see if they and the peak value ratios are also within tolerance. Other solutions may exist which similarly provide the precise signal processing capabilities needed to distinguish a particular signal pattern corresponding to a threshold crying or other noise event.

Figure 7:
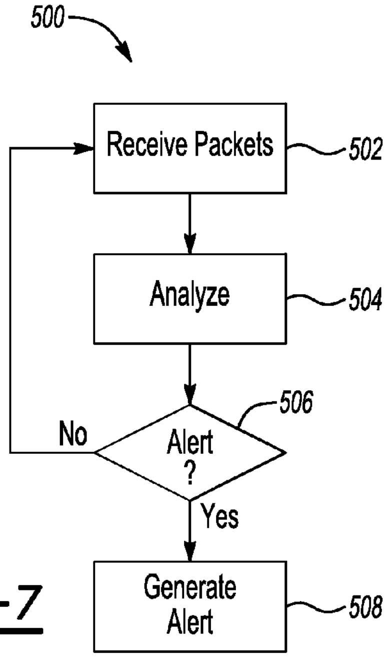
FIG. 7 is a flow chart describing a server-based method for generating alerts in response to information received from the monitor shown in FIG. 1.

Referring to FIG. 7, an example method 500 for generating the alerts (arrows 15) of FIG. 1 begins with step 502, where the remote device 14 receives the information data signals (arrows 13), e.g., data packets or other suitable signals.

At step 504, the remote device 14 of FIG. 1 analyzes the information data signals (arrows 13) over time to detect a particular trend or pattern indicative of a crying event or other monitored noise event warranting generation of an alert (arrows 15). For instance, a rolling average may be calculated for the number of frames in each of a plurality of data packet to determine if an alert (arrows 15) is required. Other approaches could use a total number of frames, a weighted average, and/or other factors.

At step 506, the remote device 14 of FIG. 1 determines if an alert (arrows 15) is required using the analysis criteria noted above with reference to step 504. If an alert is not required, the method 500 repeats step 502. The remote device 14 proceeds to step 508 if an alert (arrows 15) is required.

At step 508, the remote device 14 generates the alert (arrows 15) and transmits the alert to the computing device 20 of FIG. 1 or another networked device.

Figure 8:
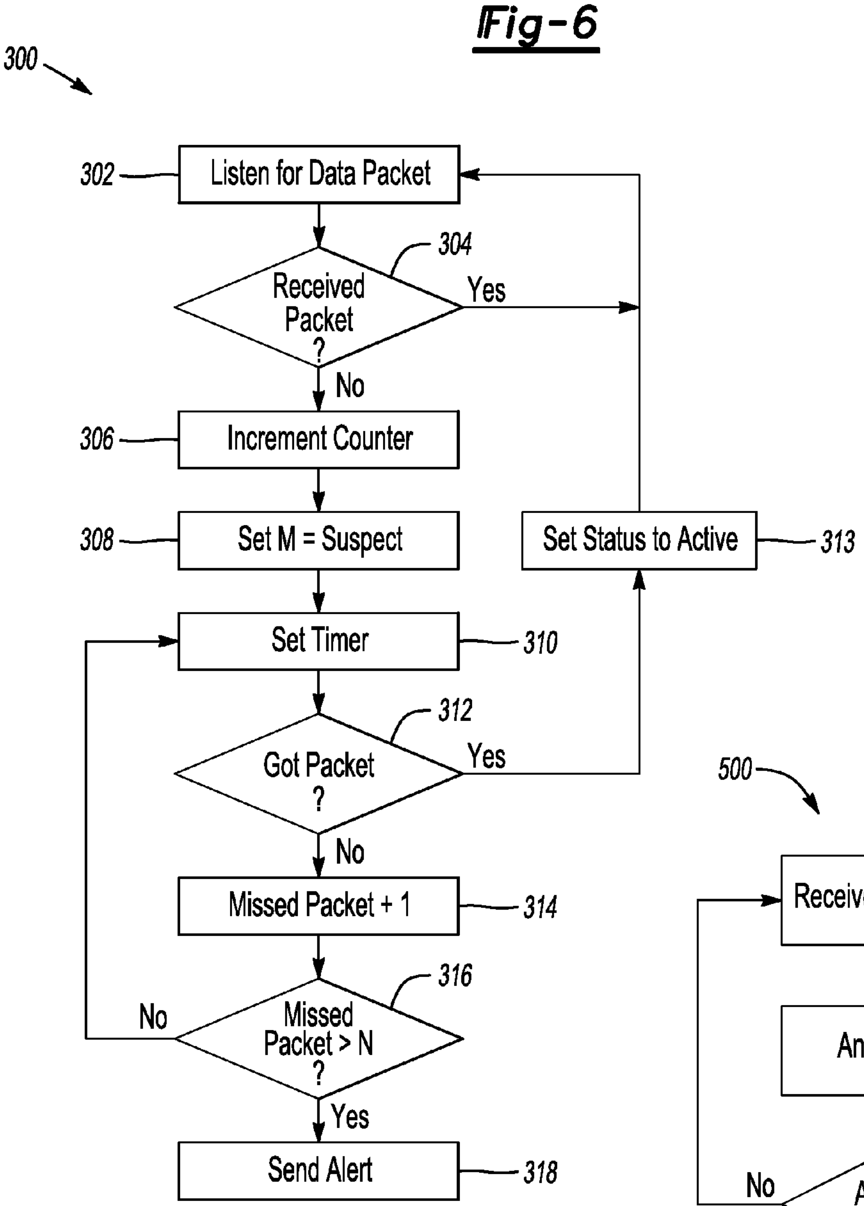
FIG. 8 is a flow chart describing a method for generating an alert using a server/remote device based on the status of receipt of discrete data packets from the monitor of FIG. 1.

Referring to FIG. 8, an example method 300 is shown for monitoring the active status of the monitor 12 shown in FIG. 1 using the remote device 14. The remote device 14 uses the data packets sent to the remote device 14 as an electronic heartbeat from the monitor 12. As understood in the art, a system's electronic heartbeat refers to the electronic signals used to indicate that a particular device is online and that all communication channels with the device are functioning properly.

At step 302, the remote device 14 listens for a discrete data packet from the monitor every (T) seconds, e.g., every 10 seconds in keeping with the earlier example embodiment.

At step 304, the remote device 14 determines whether a data packet is received when expected, i.e., when duration (T) elapses. If a data packet is received at (T) seconds, the method 300 repeats step 302. The method 300 proceeds to step 306 if a data packet is not received when expected at (T) seconds.

At step 306, the remote device 14 increments an initial counter value to indicate that a data packet has been missed. For instance, when initialized, the number of missed packets is zero. When the first missed packet occurs, the counter is incremented to one, and so on.

At step 308, the remote device 14 sets a corresponding flag (M) to "suspect", and proceeds to step 310 where it sets a timer to count down for an additional calibrated interval.

At step 312, the remote device 14 determines whether a data packet has arrived during the calibrated interval of step 308. If so, the method 300 sets status to active at step 313 before repeating step 302. If a data packet has still not arrived after the additional calibrated interval elapses, the remote device 14 proceeds to step 314.

At step 314, the remote device 14 increments a counter for actual missed packets and proceeds to step 316.

At step 316, the remote device 14 compares the number of missed packets to a calibrated threshold (N). If the number of missed packets exceeds threshold (N), the remote device 14 proceeds to step 318. If the number of missed packets does not exceed the threshold (N), the remote device 14 repeats step 310.

At step 318, the remote device 14 generates an alert message indicating that the monitor 12 is not transmitting data properly. The message may be transmitted, for example, as a phone call, a voice message, email, or a text message informing a user that the monitor 12 may be turned off, is malfunctioning, or that something may be otherwise interfering with its proper operation. Once the errors are cleared, the counters for steps 306 and 314 may be reset to zero.

In a particular embodiment, a user can manually check the status of a particular monitor 12 by accessing the remote device 14 via a mobile device, a computing device, or another system. The user may receive information from the remote device 14 indicating the present status of the monitor 12, such as "active", "suspect", or "inactive".

In another embodiment, the user can access the remote device 14 to request to hear the sound signals 21 that are received by the monitor 12, e.g., by pressing a "call monitor" button shown as option 209 in FIG. 2. The remote device 14 can initiate a data stream with the monitor 12 such that the sound signals 21 received by the monitor 12 are streamed to the remote device 14. The remote device 14 then forwards the stream of data (e.g., audible sounds) to the user, for instance via the user's mobile device, computing device, or other system. This feature allows the user to directly monitor the sound signals 21 received by the monitor 12 from a remote location.

Figure 9:
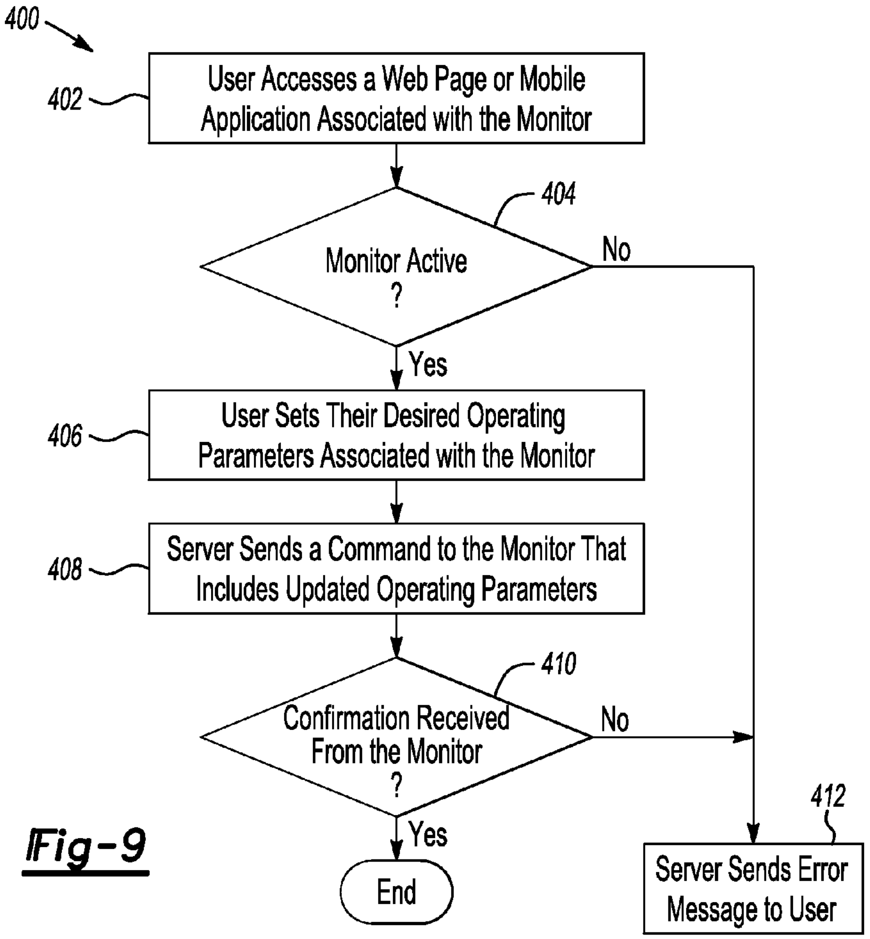
FIG. 9 is a flow chart describing an example method for remotely configuring the monitor shown in FIG. 1.

Referring to FIG. 9, a method 400 is shown for configuring the monitor 12 of FIG. 1 from the computing device 20. Beginning at step 402, a user accesses a web page or executes a mobile application associated with the monitor 12 via device 14 or 20.

At step 404, the remote device 14 or computing device 20 determines if the monitor 12 is presently active, e.g., using the result of method 300 shown in FIG. 6. If active, the remote device 14 proceeds to step 406. Otherwise, the remote device 14 proceeds to step 412.

At step 406, the user sets desired operating parameters for the monitor 12 via the configuration settings in module 48, e.g., cry or other noise parameters for a baby when the source 25 of FIG. 1 is a baby or infant.

At step 408, the remote device 14 or computing device 20 sends a command to the monitor 12 that includes the updated operating parameters.

At step 410, the remote device 14 determines whether the monitor 12 has confirmed receipt of the updated parameters, for instance by receiving a confirming signal from the monitor 12. The method 400 is finished if such a confirming signal is received.

At step 412, the remote device 14 or computing device 20 transmits an error message to the user indicating that the monitor 12 cannot be configured at present. This may indicate that the monitor 12 is not active. The particular code configurations, styles, and forms of software programs and other means of configuring code to define the operations of a microprocessor may vary without departing from the intended inventive scope.

Figure 10:
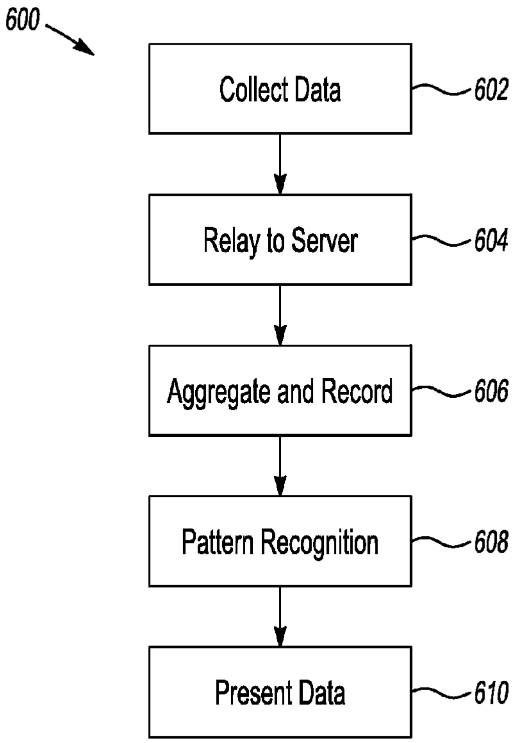
FIG. 10 is a flow chart describing an example method for aggregating, analyzing, and disseminating information collected using the monitor shown in FIG. 1.

Referring to FIG. 10, the remote device 14 of FIG. 1 may be optionally configured to log, aggregate, analyze, and ultimately report information relating to the qualitative and/or quantitative state of the sound signals 21 emanated by the source 25 shown in FIG. 1. A report may be generated and transmitted to a user, such as a parent when the source 25 is a baby. In a typical parent-child scenario, a customized report may be provided which compares the baby's sleep and crying patterns with other babies of the same or a similar age, or with the same baby relative to earlier timeframes, etc. The content of the report may be further enhanced by combining with other informative sensory data, for instance room temperature, humidity, body temperature, video, parental input, etc.

Beginning with step 602, the sound signals 21 are collected by the monitor 12 of FIG. 1. As understood in the art, sensors 17 exist for recording additional environmental information (arrow 170), such as video cameras, temperature sensors, motion detection devices, etc. Sensors 17 may be configured to collect the information (arrow 170). The collected sound signals and, optionally, other information (arrow 170) is analyzed, with suitable processing and analysis performed on the additional sensory data. Once collected, the method 600 proceeds to step 604.

At step 604, the information collected at step 602 is transmitted to the remote device 14 of FIG. 1. Step 604 may include compiling a discrete data packet such as the example data packet shown in FIG. 3, and transmitting the data packet to the remote device 14 as the data signals (arrows 13) shown in FIG. 1. As part of step 604, each data packet may be time/date stamped or otherwise uniquely coded to facilitate identification and correlation of the collected information with a particular monitor 12, user, and/or monitored source 25.

At step 606, the remote device 14 aggregates and stores the collected data from step 602 in memory 44. The remote device 14 may assign a unique classification to the collected data to retain the uniquely identifying information from step 604, and to thereby readily identify the particular monitor 12, user, and/or source 25 to facilitate data reporting.

At step 608, the remote device 14 processes the collected data using baseline information, e.g., aggregated normal population distributions from a wider population of a similar source 25, such as infants or toddlers of the same age or age range, historical reference data for the same child, etc. As part of step 608, the remote device 14 may use configuration data to determine qualifying characteristics of portions of the information.

For instance, when parents entrust a child to a babysitter for the evening, this information may be recorded. A report of crying patterns could then be correlated by the remote device 14 with the caregiver that was present on that particular evening in order to determine if the child cried more or less frequently than usual. Thus, the remote device 14 can execute an algorithm or code to determine if the baby tends to cry more or less often when left with a sitter, generally, or with a particular sitter, and/or how soon crying abates after the parents leave.

Other information such as whether the primary caregiver is male or female, married or single, the particular region of the country in which the data is collected, and/or weather patterns such as thunderstorms or rain, can be used to fine tune the reporting for comparison to a specific user profile. Sleep patterns may be compared to other babies in the same or other age/weight/race/sex or other desired categories. The remote device 14 may correlate room temperature, crying, sleeping patterns, and/or feeding data. Depending on the sensors and programming of the monitor 12, the remote device 14 may also record and analyze other parameters related to the baby's environment, such as background noise or temperature fluctuations.

In one possible embodiment, the remote device 14 can categorize sleep issues based on type, such as early morning wake ups, multiple short parent interventions to induce prolonged sleep, or extended wake periods at night. Once the data is fully aggregated and analyzed at step 608, the remote device 14 proceeds to step 610.

At step 610, the information is presented to the interested person, typically the parents in the example of a baby being the source 25 of FIG. 1. The report may be a data and graphic file, for instance text accompanied by explanatory charts, tables, images, or other supporting graphics describing how the behavior of the source 25 compares to a baseline. The report may be emailed to the computer device 20 of FIG. 1, such as a mobile device or a computer. In other embodiments, the report may be printed and mailed to the user as a high-quality finished product, complete with recommendations for addressing any issues, possibly including referrals to a sleep consultant and/or a pediatrician.

In a particular embodiment, the report may be presented to a user via a web browser when the user accesses the remote device 14 over the Internet. The user can then filter the results using pull down menus or other search criteria, e.g., filtering by age, sex, weight, location, demographics, etc. This may enable a parent or other caregiver to readily access comparative data on a sliding scale versus, for instance, an average of the selected filtering group. The user may also compare the present data to earlier collected data for the same child to determine change over time.

As will be clear from the foregoing description, the present approach enables both immediate sleep alerts, i.e., when crying spectral data matching a predetermined profile indicates a crying event is actively occurring, and longer term sleep evaluation. The latter may include sleep tracking and comparison to baselines, and may serve as a conduit to various services used to help a parent improve on one or more areas of a child's sleep-related environment. Such a tool can be used to walk a caregiver through an evaluation of the various possible issues or root causes of a baby's sleep problems, as well as intelligent recommendations for improving the overall sleep quality of their child.

While the best modes for carrying out the invention have been described in detail, those familiar with the art to which this invention relates will recognize various alternative designs and embodiments for practicing the invention within the scope of the appended claims.

The invention claimed is:

1. A method comprising:
receiving sound signals via a microphone of a monitor;
processing the received sound signals using the monitor, including dividing each second of the received sound signals into a plurality of equal time segments or frames and identifying, for each frame independently of the other frames, whether a predetermined acoustic signature is present in the received sound signals;
generating, via the monitor, an information data signal in the form of a plurality of discrete data packets each of which quantifies how closely the received sound signals of a respective one of the frames match a predetermined acoustic signature over a calibrated interval, wherein each of the discrete data packets includes a plurality of descriptive data fields describing the received sound signals;
transmitting the information data signal from the monitor to a remote device;
receiving the transmitted information data signal via the remote device;
selectively generating an alert via the remote device when a calculated rolling average or percentage of the frames match the predetermined acoustic signature over the calibrated interval.

2. The method of claim 1, wherein generating an information data signal includes processing the received sound signals by applying a transformative downsampling process to the received sound signals to thereby generate a binary value for each of a plurality of frames in the interval.

3. The method of claim 2, further comprising:
dividing the interval into a plurality of seconds; and
dividing each second into at least eight of the frames;
wherein processing the received sound signals includes separately analyzing, for each frame, how closely the sound signals match the predetermined acoustic signature.

4. The method of claim 1, further comprising:
aggregating a plurality of the data packets over time;
comparing, via the remote device, a characteristic of the aggregated plurality of data packets with respect to a baseline; and
generating a report which describes the sound signal with respect to the baseline.

5. The method of claim 1, wherein the monitor is a baby monitor configured to receive audible crying sounds of a baby as the sound signals, and wherein receiving sound signals via the microphone includes receiving the audible crying sounds.

6. The method of claim 1, further comprising:
receiving configuration data for the monitor from a user via a computing device in networked communication with the monitor.

7. The method of claim 1, wherein generating an information data signal includes calculating a level of energy associated within a magnitude spectrum of the received sound signals, and then determining if the calculated level of energy matches a pre-defined energy ratio pattern.

8. A monitoring system comprising:
a monitor having:
a microphone configured for receiving audible sound signals, wherein the monitor is in wireless communication with a server;
a first module configured for receiving the sound signals from the microphone, dividing each second of a calibrated interval of the received sound signals into a plurality of equal time segments or frames, and identifying over the calibrated interval whether a predetermined acoustic signature is present in each of the frames, respectively; and
a second module configured for generating and transmitting an information data signal in the form of a plurality of discrete data packets each quantifying how closely the received sound signals of a respective one of the frames match the predetermined acoustic signature over the calibrated interval, wherein each of the discrete data packets includes a plurality of descriptive data fields describing the received sound signals; and
a server in networked communication with the monitor, wherein the server is configured for receiving the plurality of the discrete data packets over time, and includes:
a third module configured for generating an alert, when a calculated rolling average or percentage of the frames match the predetermined acoustic signature over the calibrated interval, describing when the predetermined acoustic signature is present in the discrete data packets over time; and
a fourth module configured for transmitting the alert to a computing device in networked communication with the server.

9. The system of claim 8, wherein the monitor is configured to process the cries of a baby as the sound signals.

10. The system of claim 8, wherein the monitor is configured for applying a transformative downsampling process to the received sound signals to thereby generate a binary value for each of a plurality of frames of the interval.

11. The system of claim 10, wherein the monitor is configured for calculating energy ratios associated with each area which is harmonically related to the fundamental frequency within a magnitude spectrum, and for determining if the energy ratios match a pre-defined pattern.

12. The system of claim 10, wherein the server is configured for:
aggregating the frames over time;
comparing a pattern or characteristic of the aggregated frames to a baseline; and
generating a report which describes the sound signal with respect to the baseline.

13. The system of claim 8, wherein the monitor is configured to identify and convert the frequency of a cepstral peak of the processed sound signals to a fundamental frequency as at least part of the processing of the sound signals.

14. A baby monitoring system comprising:
a monitor having a microphone for receiving audible sound signals from a baby, wherein the monitor is in wireless communication with a server and is configured for:
receiving the sound signals from the microphone;
dividing each second of the received sound signals into a plurality of equal time segments or frames;
quantifying, for each frame independently of the other frames, how closely the sound signals match the predetermined acoustic signature over a calibrated interval; and
transmitting an information data signal in the form of a discrete data packet providing information which describes how closely the sound signals match a predetermined acoustic signature over the interval; and
a server configured for:

receiving and recording a plurality of the discrete data packets over time; and selectively generating an alert as a function of the information in the plurality of discrete data packets when a calculated rolling average or percentage of the frames match the predetermined acoustic signature over the calibrated interval.

15. The baby monitoring system of claim 14, wherein the monitor is further configured for applying a transformative downsampling process to the received sound signals to generate a binary value for each of a plurality of frames of the interval.

16. The baby monitoring system of claim 14, wherein the server is configured for:

aggregating the plurality of the data packets over time;

comparing the aggregated plurality of data packets to a baseline; and generating a report which describes the sound signal with respect to the baseline.

17. The baby monitoring system of claim 14, wherein the monitor is configured for processing the sound signals using at least one of: a high pass filter, a low pass filter, a Fourier transform, a spectral line summation, a peak signature checker, and a power cepstrum.

18. The baby monitoring system of claim 14, wherein the monitor is configured for:

calculating a magnitude spectrum and a power cepstrum for the received sound signals;

identifying and converting the frequency of a cepstral peak to a fundamental frequency;

calculating energy ratios associated with each area which is harmonically related to the fundamental frequency within the magnitude spectrum; and determining if the energy ratios match a pre-defined pattern.

* * * * *